United States Patent [19]
Mozer et al.

[11] Patent Number: 4,735,834
[45] Date of Patent: Apr. 5, 1988

[54] PLASTIC MOLDING

[75] Inventors: Larry P. Mozer; Bill T. Morgan, both of Bartlesville, Okla.

[73] Assignee: Phillips Petroleum Company, Bartlesville, Okla.

[21] Appl. No.: 929,553

[22] Filed: Nov. 12, 1986

Related U.S. Application Data

[62] Division of Ser. No. 669,164, Nov. 7, 1984, Pat. No. 4,650,629, which is a division of Ser. No. 413,030, Aug. 30, 1982, Pat. No. 4,496,301.

[51] Int. Cl.⁴ .............................................. B65D 23/00
[52] U.S. Cl. ...................................... 428/35; 215/1 K; 428/542.8
[58] Field of Search ............... 428/542.8, 35; 264/523, 264/541; 215/1 K

[56] References Cited

U.S. PATENT DOCUMENTS

| | | | |
|---|---|---|---|
| Re. 28,068 | 7/1974 | Lemelson | 427/27 X |
| 3,024,494 | 3/1962 | Szpila | 425/466 |
| 3,114,932 | 12/1963 | Donnelly | 18/5 |
| 3,309,443 | 3/1967 | Scott, Jr. et al. | 264/98 |
| 3,586,084 | 6/1971 | Redmond | 428/542.8 X |
| 3,665,063 | 5/1972 | Rupert et al. | 264/540 |
| 3,914,366 | 10/1975 | Wilson | 425/465 |
| 3,981,672 | 9/1976 | Wilson | 425/467 |
| 4,045,154 | 8/1977 | Ratheiser | 264/209.8 |
| 4,063,865 | 12/1977 | Becker | 425/467 |
| 4,075,187 | 2/1978 | Olcott | 264/89 |
| 4,076,121 | 2/1978 | Clayton et al. | 425/465 |
| 4,173,446 | 11/1979 | Larsen | 425/467 |
| 4,218,416 | 8/1980 | Gokcen | 264/167 |
| 4,258,641 | 3/1981 | Wakamiya | 114/219 |
| 4,279,857 | 7/1981 | Feuerherm | 264/541 |
| 4,318,489 | 3/1982 | Snyder et al. | 215/1 K |
| 4,323,339 | 4/1982 | de Kok et al. | 264/209.8 |
| 4,374,878 | 2/1983 | Jakobsen et al. | 428/542.8 X |
| 4,402,898 | 9/1983 | Rosenbaum | 425/467 |
| 4,406,854 | 9/1983 | Yoshino | 428/542.8 X |
| 4,422,839 | 12/1983 | Przytulla | 264/541 |
| 4,496,301 | 1/1985 | Mozer et al. | 428/542.8 X |
| 4,650,629 | 3/1987 | Mozer et al. | 428/542.8 X |

FOREIGN PATENT DOCUMENTS

| | | | |
|---|---|---|---|
| 0000823 | 2/1979 | European Pat. Off. | 215/1 K |
| 2013447 | 10/1971 | Fed. Rep. of Germany | 425/461 |
| 2455967 | 1/1981 | France | 425/467 |
| 1441228 | 11/1974 | United Kingdom | 425/465 |

OTHER PUBLICATIONS

"Blow Molding Marlex ®", vol. 4, No. 3, The Shaped Extrusion Die, May-Jun. 1963.
"Blow Molding Marlex ®", vol. 7, No. 1, Shaping the Die Bushing, Jan.-Apr., 1966.
"Blow Molding Marlex ®", vol. 7, No. 2, Shaping the Die Bushing-Machining Calculations.
Phillips Chemical Company, Plastic Technical Center Report, SSL-178, "Die Shaping Calculation Procedures", May, 1969.

*Primary Examiner*—Henry F. Epstein
*Attorney, Agent, or Firm*—Williams, Phillips & Umphlett

[57] ABSTRACT

A die ring for use in a blow molding apparatus is provided with depressions at the downstream end of the land to provide the parison with a longitudinally thickened rib and depressions at the upstream end of the land to counteract parison deformation caused by the downstream depressions.

7 Claims, 5 Drawing Sheets

PLASTIC MOLDING

This application is a division of copending application Ser. No. 669,164, filed Nov. 7 1984, now U.S. Pat. No. 4,650,629, which was a division of copending application Ser. No. 413,030, filed Aug. 30, 1982, now U.S. Pat. No. 4,496,301.

BACKGROUND OF THE INVENTION

This invention relates to plastic molding. In one aspect, it relates to an improved die ring for use in molding plastic articles. In another aspect, it relates to a new method for blow molding plastic articles. In yet another aspect, it relates to a new parison configuration from which plastic articles can be molded. In yet another aspect, this invention relates to a blow molding apparatus.

Blow molding is a very useful technique whereby a hollow extrusion of plasticized molding material, commonly known as a parison, is confined in a mold of the desired shape, and expanded to contact the wall of the mold by gas pressure applied inside the parison, thereby forming an object of the desired shape. When the molded object has a non-circular cross-section, as for example a square or an elliptical cross-section container, sections of maximum elongation of the parison wall become thinner than the remainder, thereby forming an object having non-uniform wall thickness. Efforts to solve the problem by extruding non-circular parisons, for example elliptical or rectangular parisons, or by extruding parisons having non-uniform wall thickness, previously failed, because of non-uniform linear rates of extrusion, causing twisting, curtaining, collapsing, and/or closing off of the parison.

It is known to use die shaping to allow extrusion of a thicker walled parison into areas which tend to "thin" because of blowing greater distances. Basically, die shaping consists of opening the die orifice in the area which will result in a thicker walled parison being extruded into the "problem" sector of the part. Increasing the die orifice opening is normally done by machining a sector at the die face, in either the land of the die ring or the mandrel, and "running out" the shaping onto the land surface to provide a smooth resin flow path. Depending on part geometry and the desired wall thickness increase, the land shaping may be one-tenth to nine-tenths of the total land length. Shaping a large portion of the land length will normally place considerable extra material into that wall area of the parison, but will frequently cause problems of parison channeling. Shaping width is also important. Too narrow a shaping may allow material to channel through the shaped sector and result in part wall thinning at the shaping "run out". In the past, this problem has been mitigated by using wide shapings and this is the reason why wide shapings are usually preferred. The effectiveness of shaping is a fine balance between depth, land, width, shear rate and resin properties.

Localized excessive flow rates or channeling are exacerbated by faster extrusion rates and narrowing of the die orifice. For blow molding dies to form light weight parts, such as one-gallon beverage containers, very little shaping was possible in the prior art. Shaping of over 0.002 inch would frequently cause the parison to collapse or close off at its free open end due to unequal flow of resin favoring the shaped sides. For that reason, the shaping of light weight beverage containers dies is very uncommon, due to poor parison control, but will become necessary for the production of very light weight beverage containers or jugs.

OBJECTS OF THE INVENTION

It is an object of this invention to provide die shaping to provide for the formation of a parison which remains open and controllable during the parison drop.

Also an object of the invention is to provide for a parison with increased wall thickness at selected areas.

It is a further object of this invention to provide die shaping to allow for reduction in the weight of light weight parts, especially gallon beverage containers while maintaining strength.

The above objects and other advantages are fulfilled in accordance with the following detailed description of the invention.

SUMMARY OF THE INVENTION

In accordance with one aspect of the present invention, a die ring is provided for a blow molding machine, the die ring having a first end, a second end, a longitudinal axis, and a borehole extending along the longitudinal axis from the first end to the second end. The borehole is adapted to surround a mandrel, and together the die ring and mandrel define an annulus through which plastic material may flow. The borehole defines an interior surface of the die ring which is characterized by a generally frustoconical portion having a first end and a second end and converging from the first end to the second end. The first end of the frustoconical portion of the borehole is connected to the first end of the die, and together with the mandrel forms the die land. The first end of the first frustoconical portion of the die ring is characterized by a generally opposed pair of one or more first depressions or shapings which extend from the first end of the frustoconical portion of the borehole toward the second end of the frustoconical portion of the borehole. These shapings affect the parison to be formed and provide a thickened longitudinally extending rib in the parison. The second end of the frustoconical portion of the borehole is characterized by a pair of one or more second depressions or shapings which extend toward the first end of the generally frustoconical portion of the borehole. The second depressions are positioned circumferentially offset from, preferably about normally from, the generally opposed pair of first depressions as measured from the centers of each of the pair of first depressions and the second depressions with respect to the longitudinal axis of the die ring. Preferably, a generally opposed pair of second depressions are provided in the die ring. The second depressions provide for faster parison flow at a position circumferentially spaced apart from the thickened rib so that the tendency of the parison to close off or curtain during the parison drop because of the depth of the first depressions is mitigated.

According to another aspect of the present invention, a parison is provided which has a longitudinal axis, and a cross-section, in a plane normal to the longitudinal axis, characterized by a pair of opposed first lobes and a pair of opposed sets of second lobes positioned about normal to the pair of opposed first lobes, each of the opposed pair of second lobe sets comprising a plurality of second lobes. The sets of second lobes are positioned so as to overcome the tendency of the parison to close off during the parison drop.

According to yet another aspect of the present invention, a beverage container is formed from the above parison which has a weight in the range of from about 50 to 60 grams.

In yet another aspect of the present invention, there is provided for a process of forming a parison having a generally tubular sidewall by flowing a thermoplastic material through an annulus defined between a die ring and a mandrel, the annulus having an upstream end and a downstream end, and the downstream end having been provided with at least one localized depression in at least one of the die ring and the mandrel so that a generally tubular parison is formed with a longitudinally extending thickened rib in its sidewall, the improvement of flowing a portion of the thermoplastic material through a localized depression in at least one of the die and the mandrel which is positioned upstream of the downstream end of the annulus and is circumferentially offset from the at least one localized depression at the downstream end of the annulus. It has been found in accordance with this aspect of the invention that shaping the upstream portion of the die land as well as the downstream end provides a method for expanding the limits to the shaping of blow molding dies, especially for the formation of light weight parts.

In yet another aspect of the present invention, there is provided for a process for forming a parison having a generally tubular sidewall by flowing a thermoplastic material through an annulus defined between a die ring and a mandrel, said annulus having an upstream end and a downstream end, where at least one of the mandrel and the die ring is provided with at least one localized depression at the downstream end of the annulus, so that the thermoplastic material flows through that portion of the annulus which is partially defined by said at least one localized depression as a thickened rib at a higher velocity and mass flow rate than thermoplastic material flowing through other portions of the annulus, the improvement provided by flowing a portion of the thermoplastic material through at least one localized depression at the upstream portion of the annulus which is circumferentially spaced apart from the at least one localized depression of the downstream end of the annulus, so that the thermoplastic material flows through that portion of the annulus having the depression in its upstream portion at a higher velocity than the thermoplastic material flowing through other portions of the annulus not at least partially defined by a localized depression. By providing die shaping to the upstream portion of the die land, higher velocity can be provided through portions of the annulus without a greater mass flow rate, so as to overcome rippling of the parison where it has been extruded through the annulus portion which has been provided with downstream shaping, and thereby avoiding reproduction of the ripples on the finished part or closing off of the parison and allowing for faster parison drop.

In yet another aspect of the present invention, there is provided an apparatus comprising a die ring having a generally frustoconical interior surface, and a mandrel having a generally frustoconical exterior surface, the frustoconical exterior surface of the mandrel being in juxtaposed relationship with the frustoconical interior surface of the die ring, the frustoconical interior surface of the die ring and the frustoconical exterior surface of the mandrel together forming a die land having an upstream end and a downstream end, where the downstream end of the land is characterized by at least one shallow depression in at least one of the frustoconical surfaces of the die ring and the mandrel, and the upstream end of the die land at a position circumferentially spaced apart from the at least one depression in the downstream end of the land is characterized by at least one shallow depression on at least one of the frustoconical surfaces of the mandrel and the die ring.

DETAILED DESCRIPTION OF THE INVENTION

Figure 1:
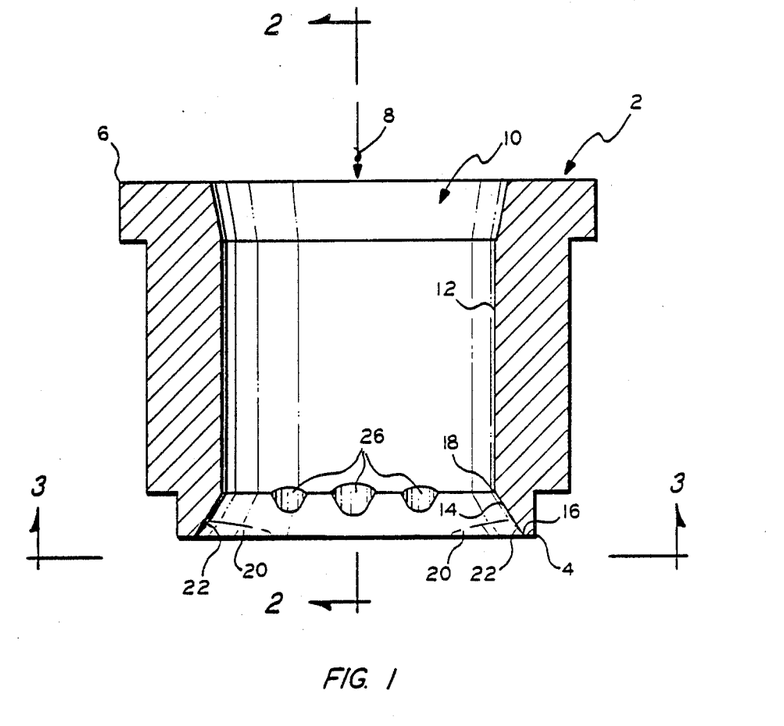
FIG. 1 is a longitudinal cross sectional view of a die ring illustrating certain features of one embodiment of the present invention.

According to the invention, a die, such a die ring or bushing 2, hereinafter, die ring 2, has a first end 4, a second end 6, a longitudinal axis represented by arrow 8, and a borehole 10 which extends along the longitudinal axis 8 from the first end 4 to the second end 6. The borehole 10 defines an interior surface 12 of the die ring 2 which is characterized by a generally frustoconical portion 14 having a first end 16 and a second end 18. The first end 16 of the generally frustoconical portion 14 is connected to the first end 4 of the die ring 2 and is characterized by certain shaping in accordance with the present invention.

The die shaping comprises at the first end 16 of the generally frustoconical portion 14 one or more first depressions 22, preferably a generally opposed pair 20 of first depressions 22 which extend from the first end 16 of the generally frustoconical portion 14 of the borehole 10 toward the second end 18 of the generally frustoconical portion 14 of the borehole 10. The second end 18 of the generally frustoconical portion 14 of the borehole 10, or at least that portion of the generally frustoconical portion 14 which is adjacent the second end 18, is characterized by one or more second depressions 26 which extend toward the first end 16 of the generally frustoconical portion 14 of the borehole 10. Preferably, the die ring is provided with a generally opposed pair 24 (see FIG. 2) of one or more second depressions 26. The second depressions 26, preferably at the second end 18 of the generally frustoconical portion 14 are circumferentially offset or spaced apart from the first depressions 22 at the first end 16 of the generally frustoconical portion 14 of the borehole 10. Where the die ring is employed to form a container having a generally square cross-sectional, the generally opposed pair 24 of second depressions 26 will be positioned about normally from the generally opposed pair 20 of first depressions 22 as measured from the centers of each of the first pair 20 and the second pair 24 with respect to the longitudinal axis 8 of the die ring 2.

For ease in fabrication, it is preferable that each one or more first depression 22 is defined by a channel having a generally cylindrical side and extending generally longitudinally along the generally frustoconical portion 14 of the interior surface 12 of the die ring 2. Each channel 22 can have a length in the range of 0.1 to about 0.9 of the length of the generally frustoconical portion 14, more generally between about 0.25 and 0.75 of the length of the generally frustoconical portion 14, length being measured parallel to the longitudinal axis 8. The circumferential width of each one or more first depression 22 as measured in degrees from the longitudinal axis 8 can generally range from about 5° to about 90°, more usually in the range of about 30° to 90°, and preferably in the range of about 45° to about 85°, because first depressions having a width within this range have been used with good results. The maximum depth of the channels with respect to the interior surface 14 is generally in the range of about 0.001 inch up to about a depth about the same as the die opening or gap, where the die opening or gap is measured between the land of the die ring and the land of the mandrel. In the prior art, where the die opening was 0.060 inch or less, the maximum channel depth was usually limited to 25 percent or less of the die opening. For example, where light weight beverage containers were to be formed, a die gap of 0.010 was used with good results. The maximum shaping depth which could be utilized without excessive channeling was about 0.002 inch. In accordance with the present invention, the depth of the shaping at the lower end 16 of the generally frustoconical portion 14 of the die ring 2 can be increased to more than 25 percent of the die opening, and this in fact preferred. For example, in a die ring to be used with a mandrel such that the die opening has a width of less than about 0.060 inch the depth of the shaping at the first end 16 of the generally frustoconical portion 14 of the die ring 2 is preferably in the range of from about 25 percent to about 100 percent of the width of the die opening, more preferably within the range of from about 30 to about 70 percent of the width of the die opening, most preferably about 30 to about 60 percent of the die gap or opening. In a die ring to be used for the formation of light weight beverage containers for use with a mandrel so that the die opening between the lands is in the range of about 0.010, a maximum shaping depth of the depressions 22 of about 0.004 inch and a width of about 60 to about 90° and a length extending along the axis 8 in the range of about 0.2 to about 0.5 of the length of the frustoconical portion 14 was used with good results.

The depressions 22 are preferably cut into the surface 12 of generally frustoconical portion 14 with either a lathe or a milling machine. Each channel 22 runs out onto the generally frustoconical portion 14 of the interior surface 12 of the die ring 2 between the first end 16 of the generally frustoconical portion 14 of the interior surface 12 of the die ring 2 and the second end 18 of the generally frustoconical portion 14 of the interior surface 12 of the die ring 2. The die ring 2 and mandrel can advantageously be formed from oil hardened tool steel.

Figure 2:
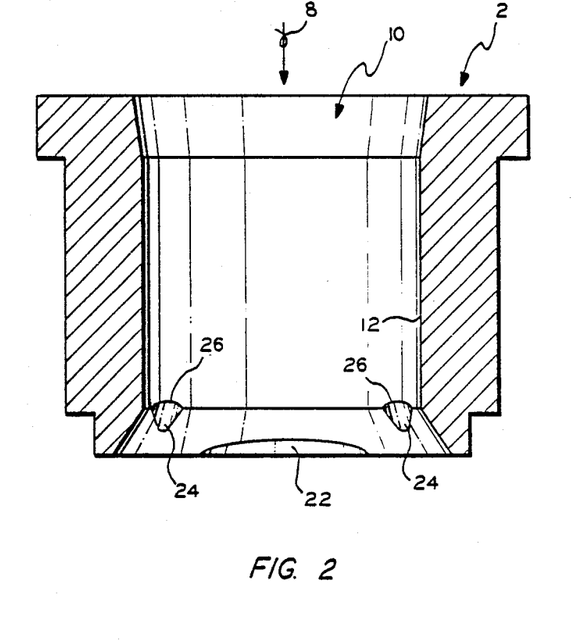
FIG. 2 is a longitudinal cross sectional view through a plane 2—2 normal to the plane of division shown in FIG. 1, illustrating certain features of one embodiment of the present invention.

It is further preferable in accordance with this aspect of the invention that each of the one or more second depressions 26 be defined by a channel having a generally cylindrical side and extending generally longitudinally from the second end 18 along the generally frustoconical portion 14 of the interior surface 12 of the die ring 2. In this embodiment of the invention, each channel 26 runs out onto the generally frustoconical portion 14 of the interior surface 12 of the die ring 2 between the second end 18 of the generally frustoconical portion 14 of the interior surface 12 of the die ring 2 and the first end 16 of the generally frustoconical portion 14 of the interior surface 12 of the die ring 2. It has been found desirable to utilize a pair of sets of depressions 26 where each set comprises a plurality of second depressions 26. Preferably, the sets of depressions 26 are generally opposed from each other. The length of each second depression 26 can generally be from about 0.1 to about 0.9 of the length of the generally frustoconical portion 14, usually from about 0.2 to about 0.8 of the length of the generally frustoconical portion 14 and more preferably from about 0.3 to about 0.7 of the length of the generally frustoconical portion 14, measuring the length of the generally frustoconical portion 14 in the direction which is parallel to the longitudinal axis 8 of the die ring 2. Where single opposed second depressions are used, their dimensions can be as previously described for the first depressions. Where opposed sets of a plurality of second depressions are employed, the width of each second depression can span an angle generally in the range of about 5° to about 45°, usually in the range of from about 10° to about 30°, preferably in the range of from about 15° to about 30° when opposed triplets of second depressions 26 are employed. Where the second depressions 26 have a width in the range of from about 10° to about 30°, they are advantageously provided with a maximum depth as measured from the surface 12 of the generally frustoconical portion 14 which is in the range of from about 0.1 to about 1.0, usually in the range of from about 0.2 to about 0.8, and preferably in the range of from about 0.4 to about 0.8 of the width of the die gap when the die gap is about 0.060 inch or less. For example, where the mandrel is positioned so as to form a die gap of about 0.010 inch, second depressions were provided with good results which had a depth of 0.006 inch.

Figure 3:
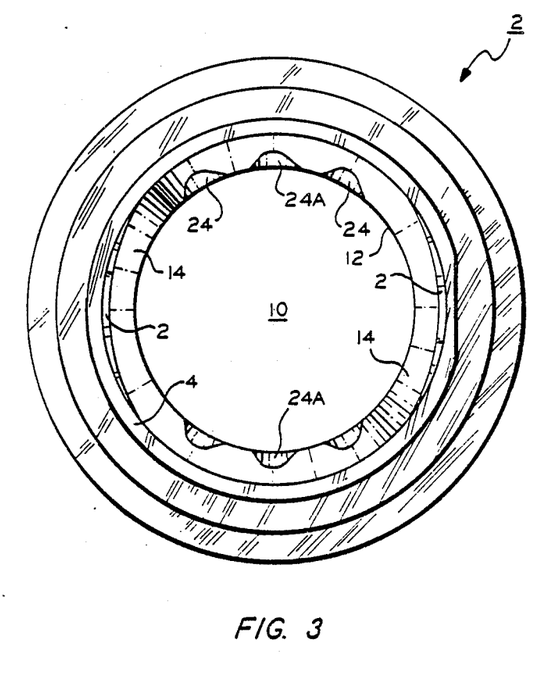
FIG. 3 is a bottom plan view showing the relationship between certain features of the invention as shown through plane 3—3 in FIG. 1.

Referring now to FIG. 3, it is preferable when the die is to be used to form a parison for the manufacture of generally square or rectangular cross-sectional containers that the second depression or sets of second depressions occupy or dwell about the annulus over an angle of about 75° to about 90° or so. Where a plurality of more than three second depressions 24 are used in a set, it is desirable that the central-most depression 24A be circumferentially offset from the center of the first depressions 20 by an angle of about 90° and that the set be circumferentially spaced across about 60° to about 90° of the interior surface of the die ring.

Figure 4:
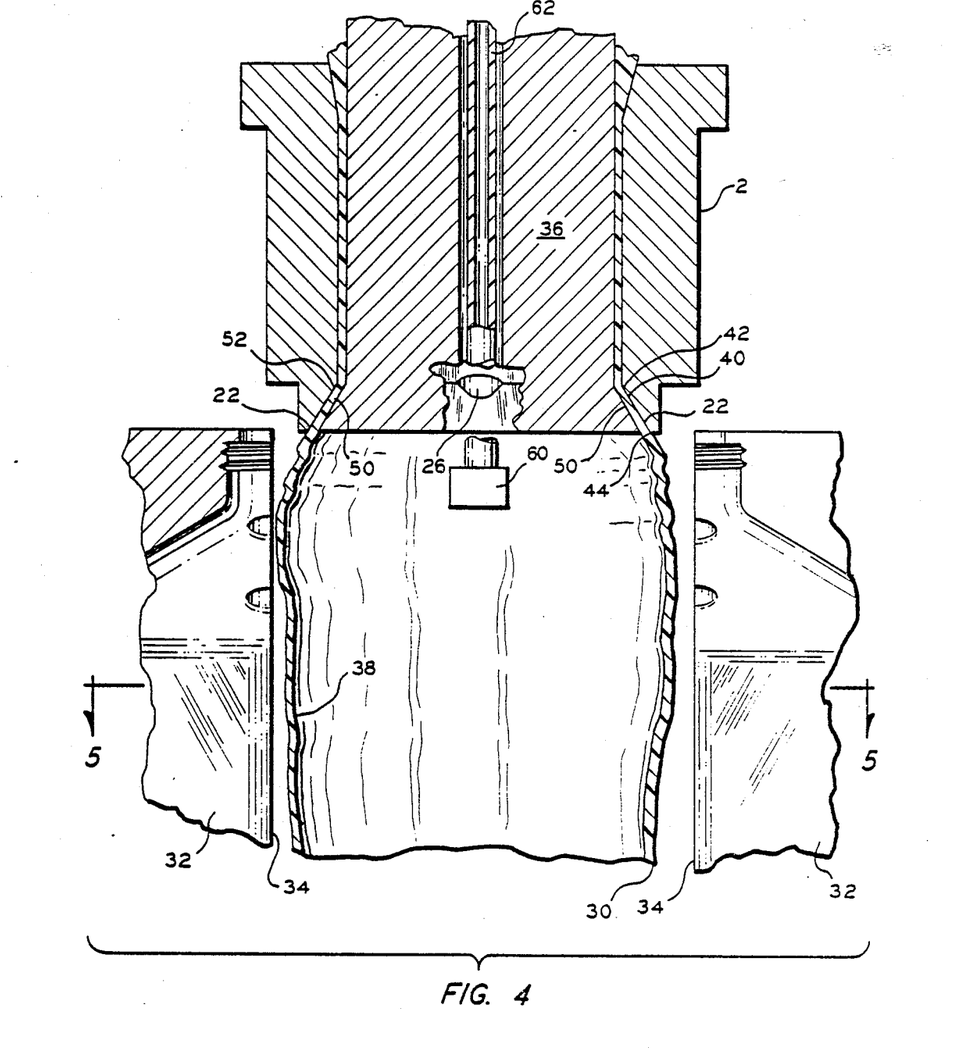
FIG. 4 represents a fragmental cross sectional view of a device incorporating certain features shown in FIG. 1 for the formation of a parison.
Figure 5:
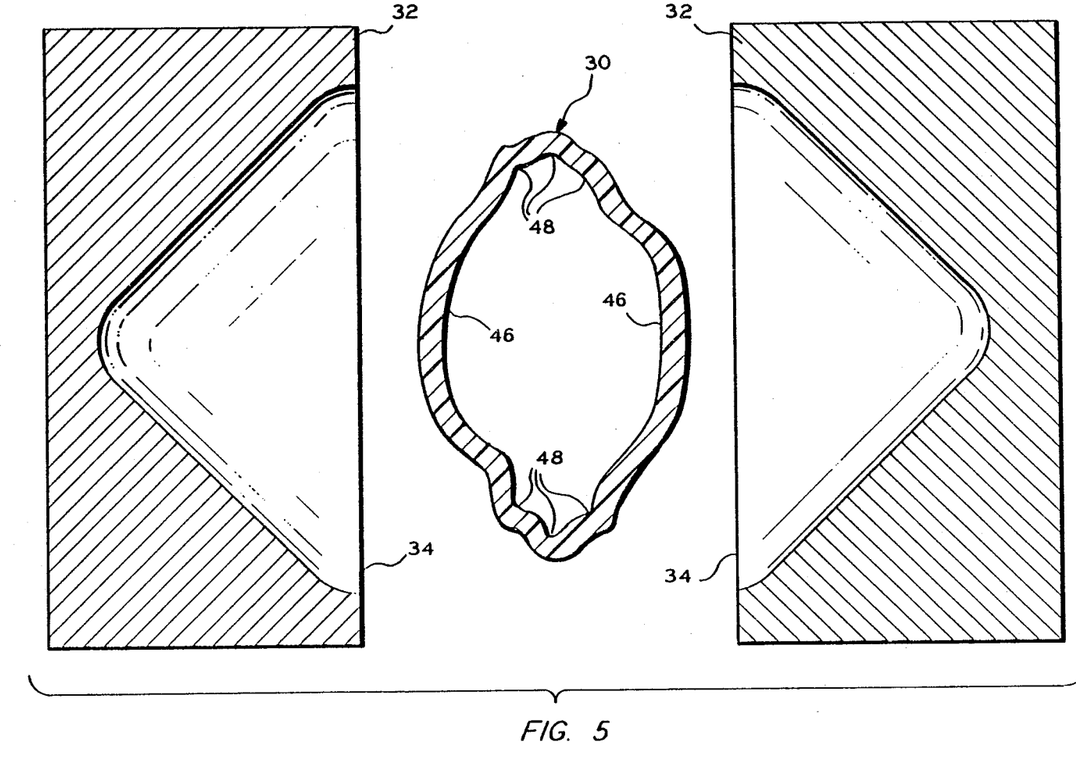
FIG. 5 is a cross-sectional view of the parison illustrated in FIG. 4 taken along the lines 5—5.

As best seen in FIG. 4, by using a die ring constructed in accordance with FIGS. 1 through 3, a parison 30 can be dropped between the halves 32 of a partable a mold having a parting line 34 positioned in relationship with the die ring 2 and a mandrel 36 so as to close onto parison 30 extruded from between the die ring 2 and mandrel 36 with parting line 34 of the mold in alignment with the plurality of opposing second depressions 26. The parison 30 has a longitudinal axis and a cross-section, in a plane normal to the longitudinal axis, as shown in FIG. 5, characterized by a pair of opposed first lobes 46 positioned in line with depressions 22 and a pair of opposed sets of second lobes 48 positioned in line with depressions 26 and positioned about normal to the pair of opposed first lobes, each of the opposed pair of the second lobe sets comprising a plurality of second lobes. The preferred material from which to construct the parison 30 is Marlex ® EHM 6006, a polyethylene homopolymer having a 0.7 melt index and 0.963 density available from Phillips Petroleum Company, Bartlesville, Okla. The parison 30 is preferably further characterized by having its greatest wall thicknesses through each of the pair of opposed first lobes. The plurality of second lobes provides the parison with structural integrity during the drop and assists in preventing curtaining, collapse or twisting. The parison 30 is useful for forming a beverage container, preferably one having a volume of between about two quarts and six quarts in mold 32. Where the beverage container has a volume of about four quarts, it can be provided with a weight in the range of from about 50 to about 60 grams. A beverage container having a weight in the range of from about 55 to about 60 grams has outstanding structural integrity when formed from a parison 30.

In yet another aspect of the present invention, in a process for forming a parison 30 having a generally tubular sidewall by flowing a thermoplastic material 38 through an annulus 40 formed between a die ring 2 and a mandrel 36, the annulus 40 having an upstream end 42 and a downstream end 44, wherein the downstream end 44 of the annulus 40 has been provided with at least one localized depression 22 on at least one of the die ring 2 and the mandrel 36 so that the generally tubular parison 30 is formed with a longitudally extending thickened rib 46 in its sidewall, the improvement is provided comprising flowing a portion of the thermoplastic material 38 through a localized depression 26 in at least one of the die ring 2 and the mandrel 36 which is positioned upstream of the downstream end 44 of the annulus 40 and is circumferentially offset from the at least one localized depression 22 at the downstream end 44 of the annulus 40. Preferably, the thermoplastic material flows through a plurality of circumferentially spaced apart localized depressions 22 on at least one of the die ring 2 and the mandrel 36 at the lower end 44 of the annulus 40. More preferably, the localized depressions 26 on at least one of the die ring 2 and the mandrel 36 are at the upstream end 42 of the annulus 40 and are circumferentially spaced apart from the localized depressions 22 at the downstream end 44 of the annulus 40. More preferably, the localized depressions 26 are circumferentially spaced between the localized depressions 22, to cause the thermoplastic material to flow through that portion of the annulus partially defined by each depression 26 at a relatively high velocity and thereby partially balance the higher velocity of the thermoplastic material flowing through those portions of the annulus partially defined by the depressions 22. If desired, the mandrel can be programmed so that the die gap can be varied as the parison is dropped. Where the invention is adapted to conventional apparatus, the annulus 40 through which the thermoplastic material 38 flows is defined between a land on the die ring 2 and a land on the mandrel 36, and the localized depressions 22 at the downstream end 44 of the annulus 40 are preferably in the land on the die ring 2 and extend in the upstream direction from the downstream end of the land and the localized depressions 26 upstream of the downstream end 44 of the annulus 40 are preferably in the land on the die ring 2 and extend in the downstream direction from the upstream end of the land of the die ring 2. In the most preferred embodiment, the thermoplastic material flows through opposed sets 24 of depressions 26 at the upstream end of the land and through an opposed pair 20 of depressions 22 at the downstream end of the land.

The purpose behind providing depressions upstream of the downstream end of the land is so that the thermoplastic material exiting from between the lands downstream of the at least one localized upstream depression 26 has a higher velocity than the thermoplastic material flowing through other portions of the annulus not at least partially defined by a localized depression such as downstream depression 22. The at least one localized depression 26 is preferably positioned circumferentially spaced apart from the depression 22 at least partially counteract stresses in the parison 30 caused by the relatively higher velocity of the thermoplastic material forming the thickened rib which flows from depression 22. For this reason, the thermoplastic material most preferably flows through an opposed pair of depressions 22 at the downstream end of the annulus 40 and opposed sets of depressions 26 at the upstream end of the annulus 40 which are positioned about normally with respect to the depressions 22 at the downstream end of the annulus as measured with respect to the longitudinal axis of the die.

In yet another aspect of the present invention, there is provided an apparatus comprising a die ring 2 having a generally frustoconical interior surface 52 and a mandrel 36 having a generally frustoconical exterior surface 50 in juxtaposed relationship with the frustoconical interior surface 52 of the die ring 2, the frustoconical interior surface 52 of the die ring 2 and the frustoconical exterior surface 50 of the mandrel 36 together forming a land having an upstream end 42 and a downstream end 44. The downstream end of the land is characterized by at least one shallow depression 22 in at least one of the frustoconical surfaces of the die ring 2 and the mandrel 36. The depression 22 is preferably in the die ring 2, because blow molding devices are generally constructed so that the mandrel 36 is rotatable, and providing the mandrel 36 with the depressions would make it difficult to maintain the proper orientation between the depressions 22 and the parting line 34 of the mold. The upstream portion 42 of the land at a position circumferentially spaced apart from the at least one depression 22 at the downstream end 44 of the land is characterized by at least one shallow depression 26 on at least one of the frustoconical surfaces of the mandrel 36 and the die ring 2. Preferably, the depression 26 and the depression 22 are both positioned in either the die ring or the mandrel, most preferably the die ring, since possible rotation between the die and the mandrel could render maintaining the desired orientation between the depressions very difficult. Preferably, the frustoconical surface of each of the die ring 2 and the mandrel 36 diverges in a direction from the upstream end 42 of the land to the downstream end 44 of the land, because such construction has been used with good results. The mold halves 32 are positioned so as to close on a parison 30 dropped from the annulus defined between the die ring and the mandrel. Compressed gas such as air is then introduced inside the parison 30 through nozzle 60 to expand the parison 30 to fit the interior dimensions of the mold halves 32 and cool it. Air is conveyed to the nozzle 60 from an air compressor not shown via tube 62 which extends through the mandrel 36 axially. Exhaust air can pass through the annulus between the tube 62 and the mandrel 36.

A die built according to the present invention has been evaluated on a laboratory two-head Uniloy 250 R2 blow molding machine. The parisons formed in runs on this machine were open as desired and produced containers free of webs with much improved wall thickness distribution as compared to containers produced by unshaped control dies. In addition to reducing the weight of the containers by in excess of 10 percent, (unshaped die containers weighing 65 grams versus shaped die containers weighing 57 grams which averaged the desired crush strength) two additional benefits also resulted. Cycle time was also reduced in excess of 10 percent. The parison cools more quickly because it weighs less. Additionally, containers formed by the present invention are characterized by higher top load strength than containers produced using an unshaped die as shown by the following table:

TABLE I

TOP LOAD STRENGTH
COLUMN CRUSH AT YIELD LOAD
(psi)

| Container | Type | Container Wt. (gm) | Invention Shaped Die | Unshaped Die | Conventional Shaped Die |
|---|---|---|---|---|---|
| Uniloy | 80122 | 55 | 21.5 | 16.0 | |
| Uniloy | 80122 | 61 | 27.2 | 20.7 | |
| Uniloy | 80122 | 65 | 29.2 | 23.4 | |
| Uniloy | 80122 | 61.0 | | | 22.0 |

These results could not be produced with existing technology nor predicted from the experimental design.

The above results were noted for containers produced by the above mentioned blow molding machine using Marlex EHM 6006 resin under the following conditions. The Marlex resin parison was extruded through the die opening of approximately 10 mils. at a resin temperature of 370° F., 188° C. The parison weighing 90 grams was dropped in 1.2 seconds followed by the mold closing. The total mold closed time was 5 seconds, 4 seconds of this time being utilized to blow the container using 90 psi blow air at ambient temperature. Said mold is temperature stable at about 40° F., 4° C. The air is exhausted from the container for 1–1.2 seconds prior to opening of the mold. The mold is open for a total of 2 seconds before the next parison. Total cycle time is 7 seconds. In an unshaped die the total cycle time is 8 seconds with a mold total closing time of 6 seconds. Parison drop time remained constant. The crush strength data were obtained using ASTM Test Method 2659-79 entitled "Test for Column Crush Properites of Blown Thermoplastic Containers" in Part 36 of the Standards.

That which is claimed is:

1. A parison having a longitudinal axis and a cross-section, in a plane normal to the longitudinal axis, characterized by a pair of opposed first lobes and a pair of opposed sets of second lobes positioned about normal to the pair of opposed first lobes, each of the opposed pair of the second lobe sets comprising a plurality of second lobes.

2. A parison as in claim 1 which is formed from a tubular wall of thermoplastic material further characterized by having its greatest wall thicknesses at each of the pair of opposed first lobes.

3. A parison as in claim 2 which is formed from polyethylene.

4. A container having a volume of between about 2 quarts and about 6 quarts which was formed from a parison according to claim 1.

5. A container as in claim 4 for containing beverages, said container having a volume between about 2 quarts and about 6 quarts and a weight in the range of from about 50 to about 60 grams.

6. A container as in claim 4 having a volume of about 4 quarts.

7. A container as in claim 6 for containing beverages, said container having a weight in the range of from about 55 to about 60 grams.

* * * * *